(12) United States Patent
Hopf et al.

(10) Patent No.: US 8,937,765 B2
(45) Date of Patent: Jan. 20, 2015

(54) DISPLAY UNIT COMPRISING A PROJECTION SCREEN FOR A HEAD-UP DISPLAY

(75) Inventors: Christian Hopf, Wetzlar (DE); Alexander Noel, Hungen-Nonnenroth (DE); Horst Rumpf, Herborn (DE)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 13/823,365

(22) PCT Filed: Sep. 16, 2011

(86) PCT No.: PCT/EP2011/066065
§ 371 (c)(1),
(2), (4) Date: Jun. 3, 2013

(87) PCT Pub. No.: WO2012/035128
PCT Pub. Date: Mar. 22, 2012

(65) Prior Publication Data
US 2013/0235454 A1    Sep. 12, 2013

(30) Foreign Application Priority Data
Sep. 18, 2010    (DE) .......................... 10 2010 046 007

(51) Int. Cl.
| | |
|---|---|
| *G03B 21/56* | (2006.01) |
| *G02B 27/01* | (2006.01) |
| *B60R 11/02* | (2006.01) |
| *B60R 11/00* | (2006.01) |

(52) U.S. Cl.
CPC ........ *G02B 27/0149* (2013.01); *B60R 11/0235* (2013.01); *B60R 2011/0005* (2013.01); *B60R 2011/0085* (2013.01); *B60R 2011/0092* (2013.01); *G02B 2027/0181* (2013.01); *B60K 2350/2052* (2013.01)
USPC .......................................... 359/443; 359/630

(58) Field of Classification Search
CPC .............................................. G02B 2027/0181
USPC ...................................... 359/443, 630; 345/7
See application file for complete search history.

(56) References Cited

U.S. PATENT DOCUMENTS

| | | |
|---|---|---|
| 3,802,764 A | 4/1974 | Ellis |
| 5,394,203 A | 2/1995 | Murphy et al. |

(Continued)

FOREIGN PATENT DOCUMENTS

| | | |
|---|---|---|
| DE | 197 14 237 C1 | 10/1998 |
| DE | 1020080 54 376 A1 | 6/2010 |

(Continued)

OTHER PUBLICATIONS

International search report received in connection with international application No. PCT/EP2011/066065; dtd Feb. 3, 2012.

(Continued)

*Primary Examiner* — Christ Mahoney
(74) *Attorney, Agent, or Firm* — Foley & Lardner LLP

(57) ABSTRACT

A display unit includes a projection screen for a head-up display. The projection screen is mounted and arranged in a carrier element in such a way that it can pivot about an axis of inclination, the incline of the screen being adjustable by a pivoting device. The pivoting device includes at least one worm gear.

7 Claims, 3 Drawing Sheets

(56) References Cited

U.S. PATENT DOCUMENTS

Figure 1:
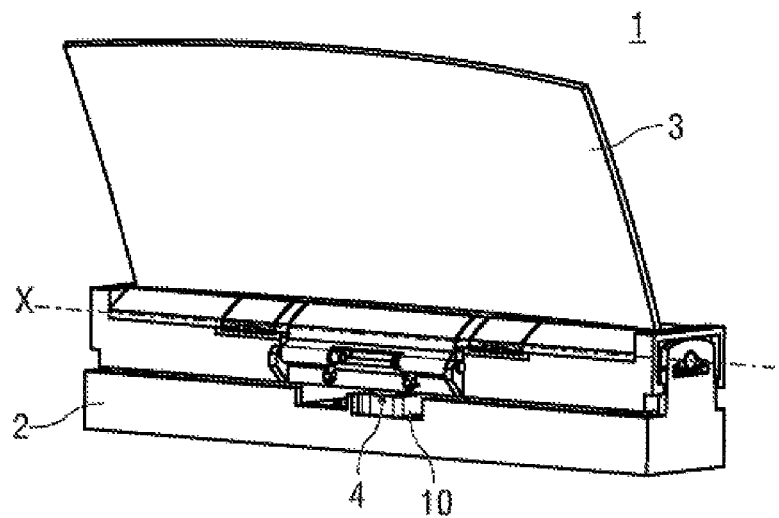

| | | | |
|---|---|---|---|
| 5,570,606 A | 11/1996 | Irie | |
| 5,734,357 A | 3/1998 | Matsumoto | |
| 8,427,751 B2* | 4/2013 | Rumpf et al. | 359/632 |
| 8,671,787 B2 | 3/2014 | Butsuen et al. | |
| 2005/0156815 A1 | 7/2005 | Aoki et al. | |
| 2013/0235454 A1* | 9/2013 | Hopf et al. | 359/446 |

FOREIGN PATENT DOCUMENTS

| | | |
|---|---|---|
| EP | 0 655 358 A1 | 5/1995 |
| EP | 2 133 594 A1 | 12/2009 |
| JP | 62-137236 | 6/1987 |
| JP | 07-238996 | 9/1995 |
| JP | 4433158 B2 | 7/2005 |
| JP | 2006-069266 | 3/2006 |
| JP | 2006-143125 | 6/2006 |
| JP | 2008-128287 | 6/2008 |

OTHER PUBLICATIONS

English translation of Office Action dated Apr. 24, 2014 received in corresponding Korean Patent Application No. 10-2013-7009782.
English translation of Office Action dated Mar. 25, 2014 received in corresponding Japanese Patent Application No. 2013-528679.
Office Action dated Aug. 26, 2014, in corresponding Chinese Application No. 201180054083.7 and English translation, 20 pages.

* cited by examiner

DISPLAY UNIT COMPRISING A PROJECTION SCREEN FOR A HEAD-UP DISPLAY

CROSS REFERENCE TO RELATED APPLICATIONS

The present application is a National Stage of International Application No. PCT/EP2011/066065 filed on Sep. 16, 2011, which claims the benefit of German Patent Application No. 10 2010 046 007.9 filed on Sep. 18, 2010, the entire disclosures of which are incorporated herein by reference.

The invention relates to a display unit comprising a projection screen for a head-up display according to the features of the preamble of claim 1.

Head-up displays of this type are generally known from the prior art and comprise a display unit having a projection screen, onto which vehicle information is projected by means of an imaging unit and, if appropriate, by means of an optical module. The projection screen is in this case designed to be transparent and is arranged in the vehicle driver's viewing range.

In order to provide the vehicle driver with an optimized display which is distinguished, in particular, by a geometrically undistorted illustration of the information, it is necessary, particularly depending on a size and resulting sitting position of the vehicle driver, to set an inclination of the projection screen about an axis of inclination running horizontally. Very fine setting is required in this case. At the same time, it is necessary to fix the projection screen securely in the set position in order to avoid a change in position during the operation of the head-up display.

The object on which the invention is based is to specify an improved display unit comprising a projection screen for a head-up display.

As regards the display unit, the object is achieved, according to the invention, by means of a display unit comprising a projection screen for a head-up display having the features of claim 1.

Preferred refinements and developments of the invention are specified in the dependent claims.

In the display unit comprising a projection screen for a head-up display, according to the invention the projection screen is mounted and arranged in a carrier element pivotably about an axis of inclination and can be adjusted in its inclination by means of a pivoting device, the pivoting device comprising at least one worm gear. A very fine and exact setting of the inclination of the projection screen can thereby be carried out, while at the same time secure fixing of the projection screen during the operation of the head-up display and during the operation of the vehicle is implemented.

The worm gear, on the one hand, makes it possible to have a very finely resolved, continuous and exact setting of the inclination of the projection screen, along with exact reproducibility. On the other hand, the result of using the worm gear is that the projection screen is fixed securely in its set position on account of the meshing of the worm wheel with a gearwheel and coupling of the worm wheel to a drive unit and because of the self-locking of the worm gear and a resulting mechanical resistance of the drive unit. Furthermore, due to the use of the worm gear and the resulting high reduction, it is possible for setting purposes to use a drive unit of low power. It is thus possible to lessen the construction space requirement for the display unit and the necessary electrical energy amount for setting the inclination of the projection screen.

The pivoting device is preferably formed from a two-stage worm gear. Such a two-stage worm gear makes it possible, because of its high reduction, to have an especially fine and exact setting of the inclination of the projection screen.

A first worm is coupled positively, materially integrally and/or nonpositively to an output shaft of a drive unit and rotates about a first axis of rotation. In this case, a drive unit is preferably designed as a conventional stepping motor.

The first worm is expediently connected operatively to a second worm which rotates about a second axis of rotation which is mounted rotatably in the carrier element.

In a preferred design variant, the second worm has a first region and a second region, the first region being designed as a gearwheel, in particular as a helically toothed worm wheel, the toothing of which is designed to match with the first worm, and the second region having worm wheel-like flights. As a result, two functions can be performed by means of a one-piece component, so that a number of structural elements of the display unit is reduced.

To allow low-friction operation, the axes of rotation of the two worm wheels preferably run essentially at right angles to one another.

In an especially preferred design variant, a transmission element is arranged at a lower end of the projection screen or of a mount of the projection screen, the transmission element being designed in the form of a segment of an arc of a circle on a side facing the second region of the second worm.

Especially preferably, a toothing is introduced into the transmission element in the form of a segment of an arc of a circle and is designed to match with the second worm, so that the transmission element is connected operatively to the second worm in such a way that a rotational movement of the second worm about the axis of rotation leads to a pivoting movement of the projection screen about the axis of inclination. Simple kinematics with a reduced number of components are thus made possible for the purpose of pivoting the projection screen.

The pivoting device is expediently mounted resiliently and fastened to the carrier element by means of at least one spring element. Oscillations, vibrations and/or accelerations of the drive unit, worm wheels and/or transmission element and resulting friction and/or wear on the drive unit, worms and/or transmission element are thereby avoided or at least lessened.

Especially preferably, a compensating movement of the second worm in the longitudinal direction of the axis of rotation can be compensated and damped by means of the spring element. In order to make this possible in a simple way, the spring element surrounds the drive unit or carrier element at least partially in a clasp-like manner, at the same time acting upon the axis of rotation in each case on the end faces and generating prestress.

Figure 2:
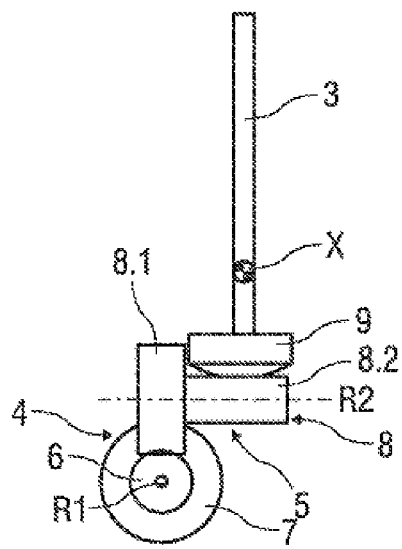
Figure 3:
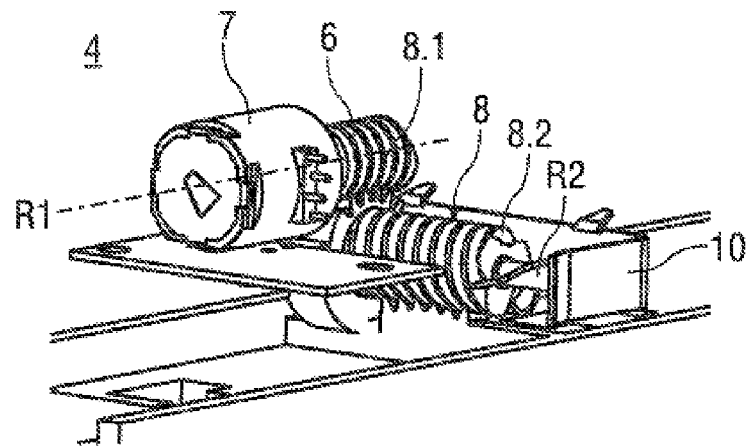
Figure 4:
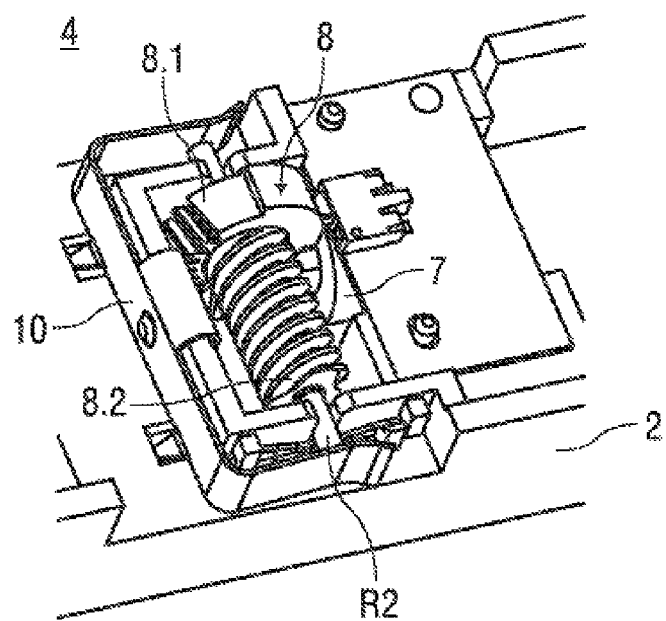
Figure 5:
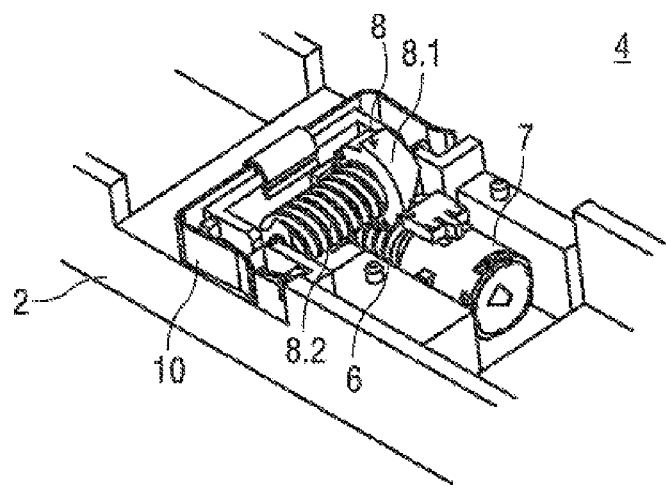
Figure 6:
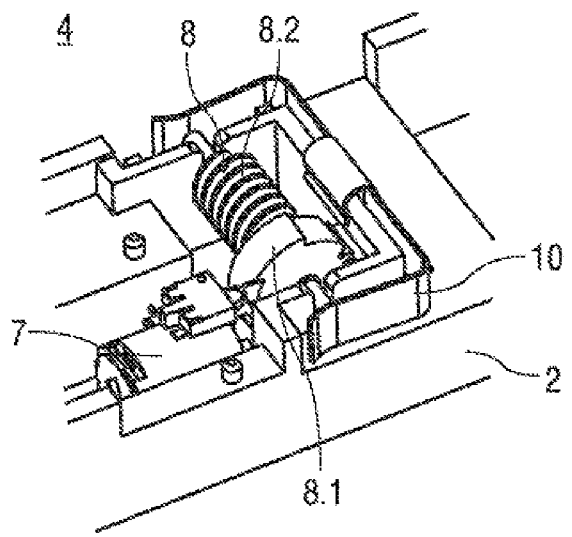

Exemplary embodiments of the invention are explained in more detail below by means of drawings in which:

FIG. 1 shows diagrammatically a detail of a display unit for a head-up display in a perspective view, FIG. 2 shows diagrammatically a greatly simplified sectional illustration of a projection screen and of a pivoting device of the display unit according to FIG. 1, FIG. 3 shows diagrammatically a first perspective view of the pivoting device according to FIG. 2, FIG. 4 shows diagrammatically a second perspective view of the pivoting device according to FIG. 2, FIG. 5 shows diagrammatically a third perspective view of the pivoting device according to FIG. 2, and FIG. 6 shows diagrammatically a fourth perspective view of the pivoting device according to FIG. 2.

Parts corresponding to one another are given the same reference symbols in all the figures.

FIG. 1 illustrates a detail of a display unit 1 for a head-up display in a perspective view. The display unit 1 comprises a carrier element 2, in which a projection screen 3 is mounted and arranged pivotably about an axis of inclination X running horizontally.

The carrier element 2 is preferably fastened in a way not illustrated in any more detail in or on an instrument panel of a vehicle. The projection screen 3 is in this case designed in such a way that it is constantly located above the instrument panel in a vehicle driver's viewing range. Alternatively, the projection screen 3 can be moved completely in a way not illustrated in any more detail, that is to say, in particular, can be introduced into a cavity inside the instrument panel beneath the surface of the latter and, when its use is desired, can be extended out of this cavity.

A pivoting device 4 is provided for pivoting the projection screen 3 about the axis of inclination X.

FIG. 2 shows a greatly simplified sectional illustration of the projection screen 3 and of the pivoting device 4. FIGS. 3 to 6 show the pivoting device 4 in various views.

The pivoting device 4 comprises a worm gear 5 which is formed from a first worm 6. The first worm 6 is coupled to a drive unit 7. The drive unit 7 is designed, in particular, as an electric motor, preferably as a stepping motor, the first worm 6 being coupled positively, materially integrally and/or non-positively to an output shaft of the drive unit 7 in a way not illustrated in any more detail.

The first worm 6 is connected operatively to a second worm 8 which is mounted with its axis of rotation R2 in the carrier element 2. The axes of rotation R1, R2 of the two worms 6, 8 in this case run essentially at right angles to one another.

To make the operative connection between the first and the second worm 6, 8, the second worm 8 has a first region 8.1 which has a toothing and thus forms a gearwheel, in particular a helically toothed worm wheel, which engages into the flights of the first worm 6 and meshes with the latter.

By a rotational movement about the axis of rotation R1 being introduced into the first worm 6 by means of the drive unit 7, a rotational movement of the second worm 8 about the axis of rotation R2 is thus generated.

In order to generate the pivoting movement of the projection screen 3 about the axis of inclination X, the second worm 8 has a second region 8.2. Flights, in particular worm wheel-like flights, are introduced into this second region 8.2 and are connected operatively to a transmission element 9 arranged at the lower end of the projection screen 3. This transmission element 9 is designed in the form of a segment of an arc of a circle on a side facing the second region 8.2 of the second worm wheel 8, a toothing being introduced into the transmission element 9 and being designed to match with the second region 8.2 of the second worm wheel 8. The toothing is in this case arranged in such a way that the rotational movement of the second worm wheel 8 about the axis of rotation R2 leads to a pivoting movement of the projection screen 3 about the axis of inclination X.

In order to avoid oscillations, vibrations and/or accelerations of the drive unit 7, worms 6, 8 and/or transmission element 9 and resulting friction and wear on the drive unit 7, worms 6, 8 and/or transmission element 9, the pivoting device 4 is fastened, resiliently mounted, to the carrier element 2.

For this purpose, at least one spring element 10 is provided, which is fastened to the carrier element 2 materially integrally, nonpositively and/or positively. The spring element 10 is in this case designed in such a way that it allows a compensating movement of the second worm 8 in the longitudinal direction of the axis of rotation R2. For example, the spring element 10 surrounds the drive unit 7 or carrier element 2 at least partially in a clasp-like manner and at the same time acts upon the axis of rotation R2 in each case on the end faces.

In the version, not illustrated, of the display unit 1 in which the projection screen 3 can be lowered completely inside the instrument panel in the cavity, the pivoting device 4 is preferably designed and provided for executing the movement of introducing and/or extending the projection screen 3.

LIST OF REFERENCE SYMBOLS

1 Display unit
2 Carrier element
3 Projection screen
4 Pivoting device
5 Worm gear
6 First worm
7 Drive unit
8 Second worm
8.1 First region
8.2 Second region
9 Transmission element
10 Spring element
R1 Axis of rotation
R2 Axis of rotation
X Axis of inclination

The invention claimed is:

1. A display unit comprising:
a projection screen for a head-up display;
a carrier element, wherein the projection screen is mounted and arranged in the carrier element pivotably about an axis of inclination; and
a pivoting device, wherein the projection screen can be adjusted in its inclination by the pivoting device, the pivoting device comprising a two-stage worm gear,
wherein a first worm gear is coupled to an output shaft of a drive unit and rotates about a first axis of rotation;
wherein the first worm gear is connected to a second worm gear;
wherein the pivoting device is fastened to the carrier element and mounted resiliently by at least one spring element;
wherein a movement of the second worm gear in the longitudinal direction of the axis of rotation can be compensated and damped by the spring element; and
wherein the spring element at least partially surrounds the drive unit or the carrier element and acts upon the axis of rotation on the end faces of the second worm gear.

2. The display unit as claimed in claim 1 wherein the second worm has a first region and a second region, the first region including a gearwheel, wherein the toothing of the gearwheel of the first region of the second worm gear is designed to match with the first worm gear and wherein the second region of the second worm gear includes worm wheel-like flights.

3. The display unit as claimed in claim 1 wherein the axes of rotation of the first worm gear and the second worm gear run essentially at right angles to one another.

4. The display unit as claimed in claim 1 wherein a transmission element is arranged at a lower end of the projection screen or of a mount of the projection screen.

5. The display unit as claimed in claim 4, wherein the transmission element is designed in the form of a segment of an arc of a circle on a side facing the second region of the second worm gear.

6. The display unit as claimed in claim 4 wherein a toothing is introduced into the transmission element in the form of a segment of an arc of a circle and is designed to match with the second worm gear.

7. The display unit as claimed in claim 4 wherein the transmission element is connected operatively to the second worm gear in such a way that a rotational movement of the second worm gear about the axis of rotation leads to a pivoting movement of the projection screen about the axis of inclination.

* * * * *